United States Patent [19]
Profet

[11] 3,857,547
[45] Dec. 31, 1974

[54] AUTOMATICALLY COMPENSATING JACK CONSTRUCTION

[75] Inventor: Anthony G. Profet, Schaumburg, Ill.

[73] Assignee: Templeton, Kenly & Company, Broadview, Ill.

[22] Filed: Mar. 18, 1974

[21] Appl. No.: 451,730

[52] U.S. Cl............... 254/103, 74/409, 74/424.8 R
[51] Int. Cl........................ F16h 55/18, B66f 3/18
[58] Field of Search...... 254/103; 74/409, 440, 441, 74/424.8 R; 90/22

[56] References Cited
UNITED STATES PATENTS
| | | | |
|---|---|---|---|
| 3,001,414 | 9/1961 | Bourne | 74/409 |
| 3,176,963 | 4/1965 | Sturm | 254/103 |
| 3,323,777 | 6/1967 | McMullen | 254/103 |
| 3,543,598 | 1/1970 | Lanzenberger | 254/103 |

*Primary Examiner*—Al Lawrence Smith
*Assistant Examiner*—Robert O. Watson
*Attorney, Agent, or Firm*—Neuman, Williams, Anderson & Olson

[57] ABSTRACT

A worm gear jack adapted to automatically compensate for thread wear so as to obviate backlash is provided. The jack employs a load-engaging screw and an actuating worm gear which threadedly engages said screw for imparting linear movement thereto. A nut adapted to automatically compensate for backlash occasioned by thread wear and other thread defects which is spaced from said worm gear, threadedly engages said screw and is connected to said worm gear so as to rotate therewith relative to said screw. A resilient spring washer engages a flange face of the compensating nut and urges the same toward the worm gear. The screw threads thus have one face thereof urged in an axial direction by the threads of the compensating nut, and the opposite face loaded by engagement with the motion-imparting threads of the worm gear. Such captivity of the screw eliminates backlash upon reversing the load forces on said screw from tension to compression and vice versa.

10 Claims, 4 Drawing Figures

PATENTED DEC 31 1974
3,857,547
FIG. 1
FIG. 2
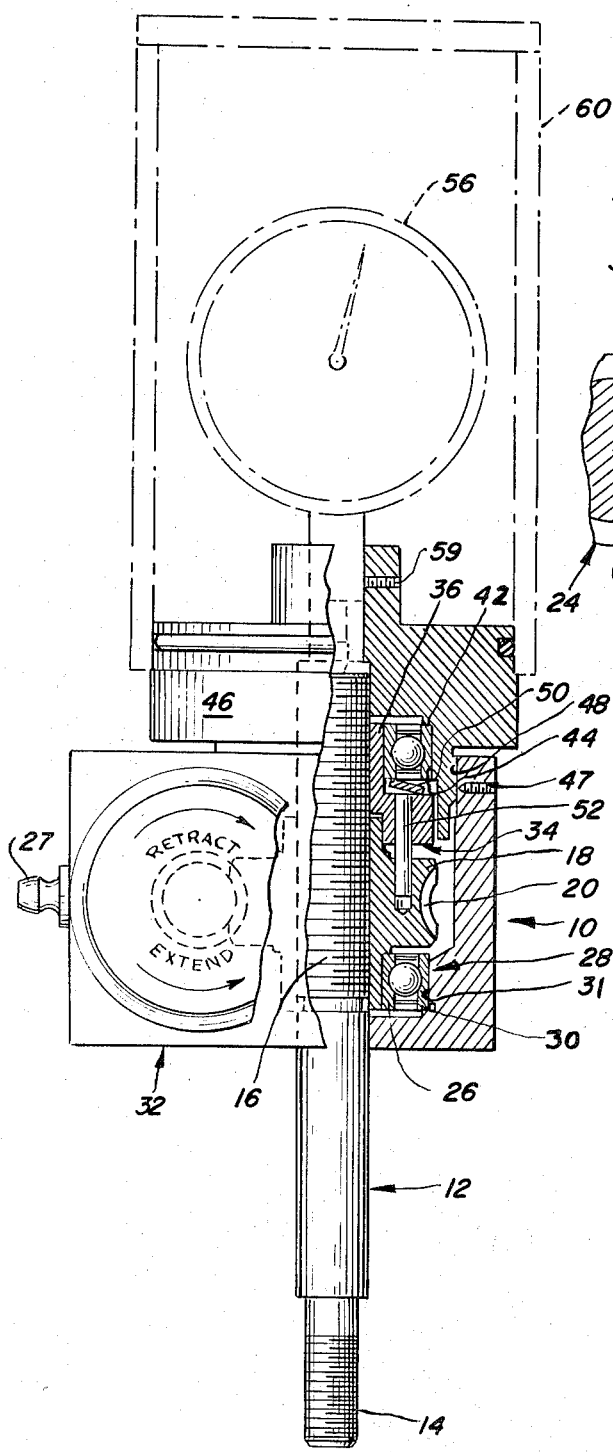
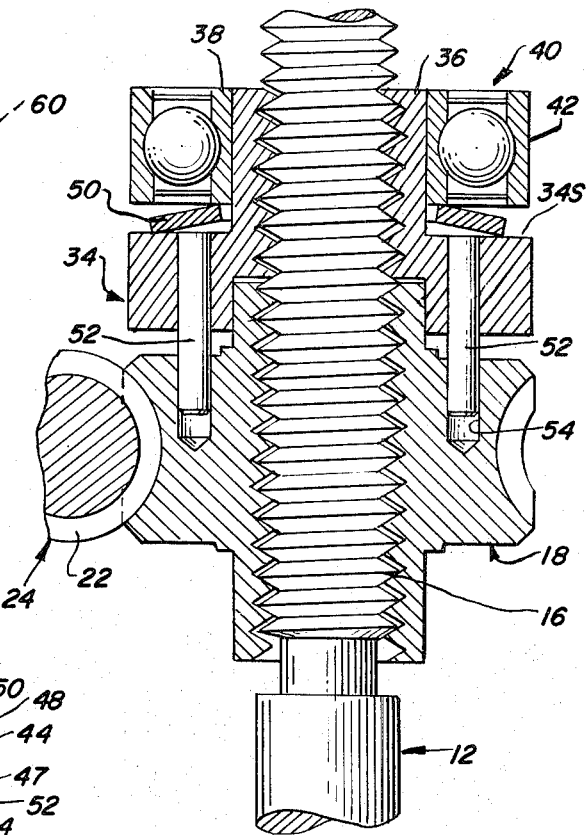
FIG. 3
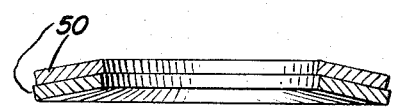
FIG. 4
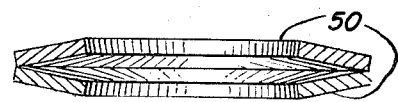

AUTOMATICALLY COMPENSATING JACK CONSTRUCTION

BACKGROUND OF THE INVENTION

This invention relates to an automatically compensating worm gear jack, and more particularly pertains to a jack employing a resiliently biased nut adapted to automatically compensate for thread wear so as not to require constant adjustment in the normal course of continued jack use.

The prior art has employed various screw jack constructions adapted to eliminate backlash. Thus in British Pat. No. 956,958 the load engaging screw is driven by split, screw-actuating, worm gear nut halves. The halves are interconnected to rotate simultaneously relative to the screw and are urged toward each other so as to clampingly engage the interposed threads of the jack screw, thereby eliminating backlash. As the threads of the nut halves become worn, the clamps must be readjusted to eliminate backlash by clamping the nut halves in a new, closer relationship.

In McMullen U.S. Pat. No. 3,323,777 which issued June 6, 1967 an anti-backlash worm gear jack is disclosed employing a lifting screw, an actuating worm gear which threadedly engages said screw and an anti-backlash nut which is connected to said worm gear so as to rotate therewith. The nut engages an adjustable cap whereby the screw threads are confined between the threads of the worm gear and anti-backlash nut thereby eliminating backlash. As the threads of the worm gear become worn, the cap must be repositioned to prevent the accompanying backlash caused by the worn threads.

In both of these prior art devices constant surveillance of the jack structures disclosed is needed to assure that thread wear has not progressed to an extent as to allow backlash and thus render repositioning of the anti-backlash devices necessary.

In accordance with this invention a lifting jack is provided which comprises a load-moving screw, an actuating worm gear threadedly engaging a central portion of the screw, and an automatically compensating nut also threadedly engaging said screw and connected to said worm gear so as to rotate therewith relative to said screw. An assembly including a cap and deflection spring such as a Belleville washer resiliently urges the compensating nut toward the worm gear whereby the threads of the screw are captured between the threads of the compensating nut and the worm gear. The axial thrust exerted on the compensating nut by the assembly including the spring allows the nut to eliminate backlash by retaining contact with the screw regardless of the position thereof in the normal course of use. The constant thrust exerted by the spring washer enables the automatically compensating nut to retain continuous contact with the screw threads thereby eliminating the need for adjustment of the compensating nut upon wearing of the worm gear threads.

It is an object of this invention, therefore, to provide a worm gear jack construction employing a resiliently biased automatically compensating nut which automatically compensates for the wear between the threads of the screw and actuating worm gear and thus eliminates backlash.

It is another object of this invention to provide a jack construction employing a novel compensating nut which automatically compensates for lead error between the screw and actuating worm gear as well as any inaccuracies which occurred in the machining of the screw and worm gear threads.

It is a further object of this invention to provide a worm gear construction which employs an automatically compensating nut which may be variably resiliently loaded and resistant to shock loads. The variable loading may be effected by spring washers to automatically compensate for thread wear as well as thermal expansion and contraction which create backlash clearances between the threads of a load bearing screw and driving gear upon load reversal on the screw as from compression to tension.

The above and other objects of this invention will become more apparent upon proceeding with the following detailed description when read in the light of the appended claims and accompanying drawing in which:

FIG. 1 is a sectional view, partly in elevation, of a worm gear jack construction made in accordance with the teachings of this invention;

FIG. 2 is an enlarged fragmentary sectional view of the screw and anti-backlash assembly of the jack construction of FIG. 1;

FIG. 3 is a sectional view of washers which may be employed to resiliently bias the automatically compensating nut of the jack construction of this invention, arranged in stacked parallel relation; and FIG. 4 is a view similar to FIG. 3 in which the washers are arranged in opposed series relation.

DESCRIPTION OF THE INVENTION

Referring now to FIG. 1 a worm gear jack 10 is illustrated employing a screw 12 adapted to engage a load at its lower threaded end 14 whereby the screw is placed under tension or compression. An upper threaded portion 16 of the screw is adapted to threadedly engage interior female threads of worm gear or screw drive nut 18 and be axially moved thereby as the worm gear rotates. The gear 18 has teeth 20 for engaging mating teeth 22 of transversely disposed driving worm 24.

Worm 24 may be actuated to rotate clockwise or counter-clockwise thereby determining the axial direction in which screw 12 is moved. Worm 24 may be disposed in a base 32 having a fitting 27 whereby lubricant may be injected into the base for lubricating the worm-worm gear threaded engagement.

Worm gear jacks are employed where extremely fine movement and precise adjustment are desired. Thus, the threads on section 16 of screw 12 may be so fine that 1,000 revolutions of the worm 24 are necessary to axially move the screw and engaged load 1 inch. Since jacks of the type illustrated in the drawing normally employ load-supporting screws of wear-resistant steel and actuating worm gears fabricated of a softer metal, the threads of the worm gears eventually wear as a result of their abrasive engagement with the threads of the driven screw. Thus upon reversing the forces exerted on the load-engaging screw whereby the screw is subject to compression rather than tension forces, or vice versa, the play between the screw and gear threads effects "backlash" thereby complicating any desired precise adjustment to be carried out by the jack.

As seen from FIG. 1, worm gear 18 rests on inner race 26 of bearing 28 which is a conrad type capable of receiving both high axial thrust and radial load. Outer race 30 of bearing 28 is set in counter-bore 31 in base 32 of the jack 10. Worm gear 18 may thus rotate with supporting race 26 of bearing 28 as the bearing resists the downward thrust of the worm gear, when the gear axially moves screw 12 while driven by worm 24. The screw 12 may be suitably keyed as by the base 32 to axially move without rotation in the normal course of use.

Spaced from gear 18 is automatically compensating nut 34 having the same interior female threads as gear 18 for mating with the male threads of section 16 of screw 12. Nut 34 has upper pilot portion 36 of reduced diameter which is received within inner race 38 of top load, conrad-type bearing 40 which may be identical to bearing 28. Outer race 42 of bearing 40 is received in counter-bore 44 of shell cap 46 which threadedly engages the base 32 at 48.

In accordance with this invention a bowed deflection spring 50 (see sectional views of FIGS. 3 and 4) which may comprise a washer of the type known as Belleville spring washers is compressed by the bottom face of inner race 38 of top bearing 40 against upper flange surface 34S of nut 34 to a pre-load equal to or less than the jack capacity. The load is applied to the washer 50 by threading shell cap 46 into the base 32 at 44, thereby exerting a downward thrust on the bearing 40 as the inner race 38 directly engages and loads the washer 50. After the washer is desirably loaded the shell cap may be locked in position by set screw 47.

Backlash is eliminated in the jack 10 since screw 12 is locked between the worm gear 18 and the compensating nut 34 as the threads of the nut 34 engage upper thread surfaces of the screw 12 and the threads of the worm gear 18 engage the lower thread surfaces of the screw as viewed in FIGS. 1 and 2 of the drawing.

It is the function of connecting pins 52 extending between nut 34 and gear 18 to enable the nut to turn simultaneously with the worm gear relative to screw 12. The pins are anchored to the nut 34 while slidably movable in bores 54 of the worm gear 18. Thus as gear 18 rotatably drives screw 12 in the normal course of jack operation, the nut is simultaneously rotatably driven by gear 18 with a constant nut-gear interval therebetween as measured along the screw axis except for the variance which may be created by worm gear thread wear resulting from screw-gear engagement. Any backlash which would normally result from the thread wear is negated by the washer 50 which maintains the screw 12 locked between the worm gear and automatically compensating nut until the thread wear is such that a lower surface portion of nut 34 engages an upper surface portion of gear 18, destroying the captivity of the screw threads. Also, the nut 34 would cease to effectively function if the thread wear is such at the gear-screw thread interfaces that the screw 12 may no longer be axially driven. It should be noted that although the screw-engaging threads of the worm gear are subject to greater wear because of their driving function, the threads of the nut 34 enable the nut to function as a safety device even should the threads of the worm gear be worn to the extent that they fail. Nut 34, therefore, functions as a safety device preventing jack damage in the event of worm gear thread failure.

A dial indicator 56 may be locked by means of a set screw 59 to an upper neck portion of shell cap 46 and be sensitive to the axial movement of screw 12 so as to provide a visual indication thereof. Indicator 56 may be encased in transparent dust and moisture proof dome 60.

FIG. 3 is illustrative of a washer arrangement in which the stacked washers 50 are arranged in parallel whereby the resulting deflection force would be double that of a single washer 50 illustrated in place in FIGS. 1 and 2, although the permissible deflection distance will be substantially the same as that of a single washer.

FIG. 4 is illustrative of a series arrangement of washers 50 arranged face to face in which the deflection permitted by the washers is substantially double that of a single washer although the deflecting force remains substantially equal to that of a single washer. Such an arrangement would thus allow for greater thread wear and be employed with a greater nutworm gear interval than is illustrated in the drawings.

The provided jack construction eliminates any need for constant jack surveillance to assure effective loading of the automatically compensating nut 34. The washer 50 constantly urges the threads of the nut 34 into thread-capturing engagement with the screw threads in cooperation with the worm gear 18. The nut 34 compensates for thread wear and lead error over the length of the screw, defects in manufacture, and prevents jack damage should shock loads be suddenly applied. Backlash resulting from the jack bearing constructions is similarly automatically eliminated by the novel resiliently loaded nut 34.

Although a Belleville washer has been above disclosed as the biasing means to urge the nut 34 into thread-capturing relation in cooperation with the gear 18, equivalent resilient means urging the nut toward the worm gear such as an appropriately positioned coil spring, poly-urethane or equivalent rubber-like material, between the nut 44 and bearing 40 will work to equal advantage.

Also, although FIG. 1 illustrates the load engaging end of the screw as being the lower end, the above described invention may, of course, work to equal advantage in a jack construction in which the upper screw end is load engaging in the normal position of use and the gauge 56 is removed to the lower screw end.

I claim:

1. In a jack construction of the type described, the combination comprising a load-moving screw, a worm gear having a threaded portion threadedly engaging said screw and imparting axial movement thereto upon worm gear rotation, an automatically compensating nut spaced from said worm gear having a threaded portion threadedly engaging said screw, means interconnecting said worm gear and said automatically compensating nut for rotating said worm gear and automatically compensating nut as a unit relative to said screw and permitting variances in the spacing between said worm gear and automatically compensating nut along an axis parallel to the axis of said screw, and means resiliently loading said automatically compensating nut whereby the threads thereof urge one face of the screw threads in one axial direction, and the opposed face of said screw threads is loaded in an opposed axial direction by the threads of said worm gear in the normal course of extended jack use.

2. In a jack construction of the type described comprising a load-moving screw, a worm gear threadedly engaging said screw and imparting axial movement thereto upon gear rotation, backlash preventing means spaced from said worm gear and threadedly engaging said screw, means interconnecting said backlash preventing means and said worm gear whereby said backlash preventing means and said worm gear rotate as a unit relative to said screw in planes substantially transverse to said screw, the interconnecting means being slidably movable relative to said worm gear whereby the interval between said backlash preventing means and said worm gear along an axis parallel to the said axis of said screw may vary, and means resiliently urging said backlash preventing means toward said worm gear whereby opposite faces of the threads of said load-moving screw are constantly loaded by said backlash preventing means and worm gear respectively in the normal course of extended jack use without the need for external adjustment of the jack.

3. The construction of claim 2 in which drive pins are the interconnecting means and said backlash preventing means comprises a nut in which said pins are anchored; said drive pins being slidably received in apertures disposed in said worm gear.

4. In a jack construction, the combination comprising a load-moving screw, a worm gear threadedly engaging said screw for axial movement thereof, an automatically compensating nut threadedly engaging said screw, means resiliently loading said automatically compensating nut whereby said nut is urged toward said worm gear, the threads of said screw are captured between the threads of said automatically compensating nut and the threads of said worm gear and axial travel of said screw relative to said worm gear occasioned by mating thread wear is obviated upon changing load application to said screw; interconnecting drive means extending between said automatically compensating nut and said worm gear forcing said automatically compensating nut and worm gear to rotate as a unit relative to said screw but permitting relative axial movement therebetween as may be occasioned by the screw-worm gear thread wear, said means resiliently loading said automatically compensating nut exerting adequate axial thrust thereon so as to maintain the screw threads captured between the automatically compensating nut and the worm gear after said automatically compensating nut has approached said worm gear along the screw axis as a result of thread wear between the worm gear and screw normally incurred in the course of jack use.

5. The jack construction of claim 4 in which said automatically compensating nut has drive pins comprising said interconnecting drive means anchored therein, said pins being slidably receivable in apertures disposed in said worm gear; said drive pins being arranged parallel to the axis of rotation of said nut and worm gear.

6. The jack construction of claim 5 in which the loading means comprises a Belleville washer centered about said screw and urges a flange of said automatically compensating nut axially in the direction of said worm gear; said washer engaging an inner bearing race at its inner periphery and engaging said nut flange face at its outer periphery.

7. The jack construction of claim 6 in which said bearing is engaged by a shell cap threadedly engaging an opening in a base in which said bearing, washer, worm gear and nut are disposed and through which said screw extends, movement of said shell cap into said base urging said bearing against said washer whereby said nut is resiliently loaded.

8. The jack construction of claim 7 in which said worm gear is mounted on the inner race of a lower bearing disposed in said base, said lower bearing inner race resisting axial thrust of said worm gear as said screw moves axially relative thereto during gear rotation.

9. The jack construction of claim 4 in which said automatically compensating nut is loaded with a force by the loading means equal to or slightly less than the load capacity of said jack.

10. The jack construction of claim 7 in which said screw is prevented from rotating in the course of axial movement by being keyed to said base, and said shell cap is locked to said base after loading said washer by a set screw.

* * * * *